Dec. 9, 1941.  A. E. SMITH  2,265,321
METHOD OF JOINING WIRE
Original Filed March 1, 1940
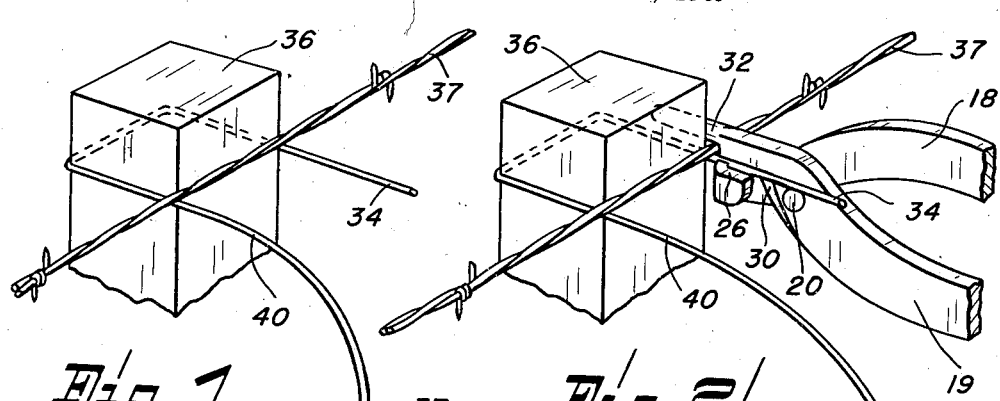
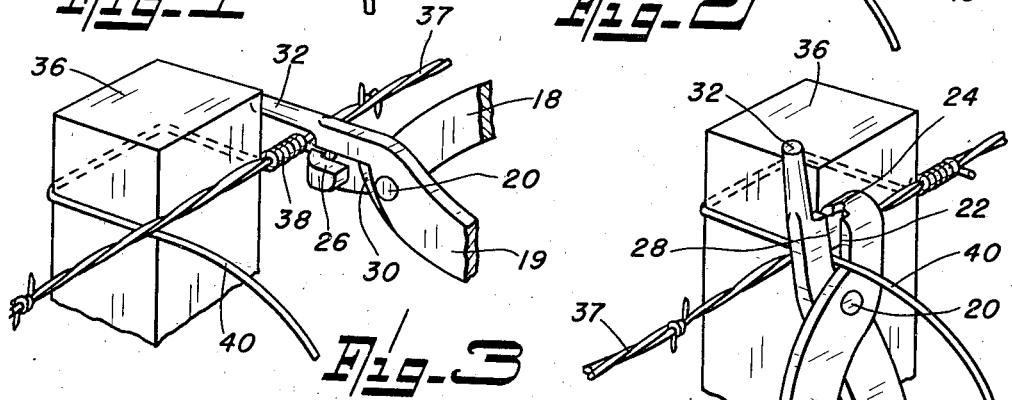
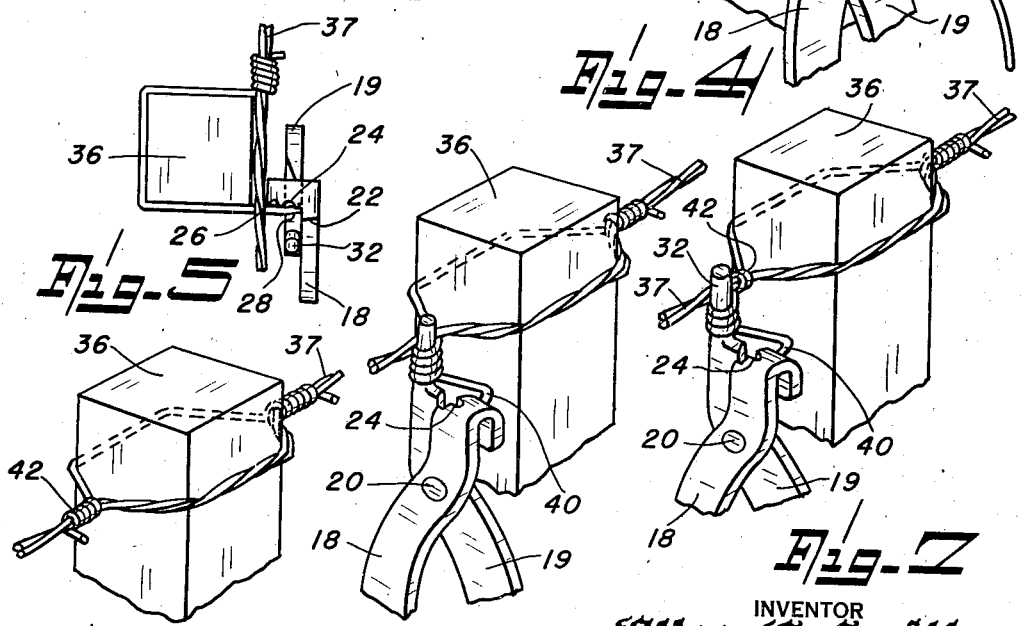
INVENTOR
Allen E. Smith
BY
Smith + Jack
ATTORNEYS Patented Dec. 9, 1941

2,265,321

UNITED STATES PATENT OFFICE 2,265,321

METHOD OF JOINING WIRE

Allen E. Smith, Seattle, Wash.

Original application March 1, 1940, Serial No. 321,671. Divided and this application August 20, 1940, Serial No. 353,375

4 Claims. (Cl. 140—123)

This invention relates to the art of handling wire and more particularly to a method of joining wire and its use, for example, in anchoring fencing, transmission lines, and the like, to their provided supports. This application is a divisional application of application Serial No. 321,671, filed March 1, 1940. The prior application discloses a method of anchoring wire as well as a specific form of a means useful in performing the method therein taught.

The present application contains matter relating to the teaching of the method, which matter has been carved out of the above-mentioned prior application and is herein separately claimed as a divisible portion of the original disclosure. My method consists essentially in a sequence of steps and is very useful in joining a standing or stretched wire to a support by means of an auxiliary or anchoring wire which must be passed around the support and have its ends joined firmly and securely to the standing or stretched wire. By my method I eliminate the undesirable results that attach to the use of anchoring means such as staples or anchor bolts and the like.

In the course of the following description I will refer to my method as though it were used in fencing operations, and as though applied to wire of the double twisted type which is generally stiff and unwieldy to handle and yet must be firmly anchored when stretched to the supporting posts. My method, however, is not to be limited by the exemplifications referred to in describing it herein.

As a means of making it more clear just how the operations of the method are performed I illustrate and describe a tool with which a person practicing the method can readily accomplish its results. Of course, the method can be carried out by other apparatus, and the fact that a specific tool is employed in the following description must not be construed as limitive.

An important object of my invention has been the origination of a method of anchoring wire to support means and of forming anchoring means for use in my method.

Another object of this invention is to provide a method of joining wires by hand which is simple to follow and certain to produce satisfactory results even though practiced by the most inexperienced person.

A further object of my invention is to provide a method of joining wire in which a piece of wire may be passed around a support member cut to length and applied to a wire stretched past said support member to effect a secure anchor of the standing wire to the support member.

Other and more specific objects of the invention will be apparent from the following description taken in connection with the accompanying drawing, wherein Figure 1 is a perspective view of a primary step taken in the practice of my method of joining wire and in this instance is specifically applied to double stranded fence wire, which is anchored to a suitable fence post, Figures 2 and 3 are perspective views showing the manner in which the step of joining one end of the anchor wire to the standing wire is performed, Figure 4 illustrates a subsequent step of the method; namely, that of severing the anchoring wire, Figure 5 is a top plan view showing the step immediately following Figure 4 in which the wire has been cut, and Figures 6, 7 and 8 are sequential, perspective views illustrating the final stages in the joining of the anchoring wire to the standing wire in which the former is securely wrapped around the latter.

Referring to the drawing throughout which like reference characters indicate like parts, the numerals 18 and 19 designate a pair of handle members which are pivotally joined together in a scissor-like relationship, as by means of the rivet or pin 20. This tool, which is very useful in practicing the method herein taught, has cutting jaws 22 and 28, one on each member 18 and 19, respectively. They are ordinarily located adjacent the pivot pin 20 in order that a maximum of leverage can be obtained. The jaws may be beveled away from the cutting edges in the conventional manner in order to provide clearance during the cutting operation.

Jaw 22 has a return bend portion 26 which lies parallel to the jaw but is spaced therefrom approximately the thickness of the jaw 28. In the bend I form a guide notch 24 upon which the jaw 28 closes when the cutting edges are brought into cutting position.

The forward portion of the handle 19 has a clearance face 30 which is adjacent the pivot on the pin 20 and which materially adds to the convenience of the pliers during a wrapping or serving operation later to be described. Extending outwardly from the jaw 28 is formed the finger-like portion 32 which has a diameter substantially equal to the body thickness of the jaw 28 to give it adequate strength for its functions. The former finger 32 is usually provided with some taper towards its outer end and is preferably round in cross section to more smoothly receive wire that is wrapped upon it.

Such a tool as is herein mentioned would ordinarily be of a size comparable to the usual pliers, and thus be readily adapted to hand use. In using such a tool for the practice of my method of tightening wires, it is normally used after the showings of Figures 1 through 8, inclusive, in the accompanying drawing.

The first operation is, normally, to uncoil from a coil of wire a short portion with its free end 34 extending out from the center post 36 a sufficient distance so that adequate wrap can be made around the fence wire 37. The wire then encloses the post on three of its sides, substantially after the showing of Figure 1.

The wire is then grasped after the showing of Figure 2 in which the wire end 34 will be gripped between notch 24 of member 18 and the surface of member 19. Sufficient pressure is applied to assure full tension on the wires and yet enable them to slip somewhat through the jaws. From this position the plier is rotated around the fence wire in a plane at right angles to the wire 37 so that the twist is made as indicated at 38 in Figure 3. If the proper length of wire is selected, which can be readily determined by experiment, it will normally be twisted about wire 37 until end 34 has been entirely wound about the fence wire.

When the first coil is completed as shown in Figure 3, the plier is then removed from the right hand side of the fence post. The tool is then placed so as to grip the opposite end of the wire as 40 and cut the wire from its coil with the tool so held as to cut a length of wire sufficient to pick up the slackness of a fence wire. When the cut has been completed, in the position shown in Figure 4, the end 40 of the wire will then be gripped between the flat surface 26 of member 18 and the cutting surface of member 19. This step in the operation is indicated in Figure 5. The finger portion 32 is then pressed against the fence wire 37 and, with the end of the wire gripped between the jaws of the pliers, the wire is wrapped about the former finger 32 after the showing of Figure 6. In so doing, the wrapping wire will be tightened and will tend to pull the fence wire 37 partially around the fence post on each side, thus reducing its length and tightening the same between posts to the desired tension. This operation is accomplished by rotating the whole pliers, after the showing of Figure 6, about the longitudinal axis of the finger 32.

As the wire 40 is formed in spiral coils about the former finger 32, tension is placed upon that portion of the wire 40 that passes behind the post 36 and thence to the point where it was initially anchored to wire 37 by the serving or wrapping 38. The effect is to tension the fencing wire. It will be seen that as the fencing wire becomes tighter, more leverage will be required to rotate the bar or finger 32 about its axis as described. For that reason I have tapered the finger 32 as is clearly indicated in the drawing. This tapering serves to gradually increase the ratio between the diameter of the finger and the spread of the handle members 18 and 19 as the coil of wire forms upon the finger in the manner best illustrated in Figure 6.

The next operation is to wind the wrapping coil about wire 37. This is done in the manner best illustrated in Figure 7, in which the tool is passed over and around the fence wire and at the same time revolves in the reverse direction from that shown in Figure 3, so that the wire that has been previously wound around finger 32 will be formed into the second coil 42 around the fence wire. When the desired length of coil 42 has been secured, the end of the wire is cut off by use of the cutting surfaces 22 and 28 of the jaws of the pliers, and the operation is complete. This final stage is shown in Figure 8 in which it will be noted that the fence wire partially encircles the fence post, and the wrapping wire completes the encircling of it. During this operation the fence wire and the wrapping wire tend to cut into the wood of the post and normally this action is sufficient to hold the fence wire definitely in position without the need of the usual staples.

Briefly again, the steps of the method consist in anchoring a piece of anchor wire to a standing wire closely adjacent the support member to which the standing wire is to be joined. The next step is the severing of the anchor wire to a suitable length for the final joiner to the standing wire in opposed relation to the first mentioned joiner, coiling this unjoined end of the anchor wire around a suitable member in order to apply tension to the anchor wire and the standing wire, and then serving the uncoiled end of the anchor onto the standing wire whereby a neat, taut, and efficient joinder results.

The foregoing description and the accompanying drawing are believed to clearly disclose a preferred embodiment of my invention, but it will be understood that this disclosure is merely illustrative and that such changes in the invention may be made as are fairly within the scope and spirit of the following claims:

I claim.

1. The method of anchoring wire to a support which comprises positioning a standing wire across a support member, securing an anchor wire to said standing wire adjacent one side of said support, passing the free end of the anchor wire around said support to the opposite side thereof and across the standing wire, temporarily securing said anchor wire to a bar having its longitudinal axis transverse of and adjacent to the standing wire, rotating the bar around its longitudinal axis until a coil of the anchor wire is formed thereon, the coiling operation being performed with said bar resting on the standing wire on the opposite side thereof from the direction whence comes the anchor wire, and subsequently revolving said bar substantially radially of the longitudinal axis of the standing wire to unlay the coil of anchor wire from the bar and to simultaneously serve it onto the standing wire.

2. The method of joining two wires which comprises crossing the two wires, temporarily securing one of said wires to a bar having its longitudinal axis transverse of and adjacent to the other of said wires, rotating the bar around its longitudinal axis to coil the temporarily secured wire therearound, while said bar rests on the other wire on the opposite side thereof from the direction whence comes the wire being coiled and subsequently revolving said bar substantially radially of the longitudinal axis of the other wire to unlay the coil from the bar and to simultaneously serve it onto the other wire.

3. The method of joining two wires which comprises crossing the wires, temporarily securing one of said wires to a bar having its longitudinal axis transverse of and adjacent the other of said wires, coiling the temporarily secured wire around said bar, while said bar rests on the other wire on the opposite side thereof from the direction whence comes the wire being coiled and finally unlaying the coil of wire from said bar and simultaneously serving it onto the other wire.

4. In a method of joining two wires which comprises crossing the wires, coiling one of said wires to a bar having its longitudinal axis transverse of and adjacent the other of said wires while said bar rests on the other wire on the opposite side thereof from the direction whence comes the wire being coiled, and subsequently revolving said bar substantially radially of the longitudinal axis of the other wire to unlay the coil from the bar and to simultaneously serve it onto the other wire.

ALLEN E. SMITH.